United States Patent [19]

Tajima et al.

[11] Patent Number: 4,467,982
[45] Date of Patent: Aug. 28, 1984

[54] WEBBING WINDING FORCE RESTRAINING DEVICE

[75] Inventors: Hiromi Tajima, Toyohashi; Akinori Fujiwara, Nagoya, both of Japan

[73] Assignee: Kabushiki Kaisha Tokai-Rika-Denki Seisakusho, Aichi, Japan

[21] Appl. No.: 373,298

[22] Filed: Apr. 29, 1982

[30] Foreign Application Priority Data

May 7, 1981 [JP] Japan .................................. 56-68686
Oct. 5, 1981 [JP] Japan ........................... 56-147852[U]

[51] Int. Cl.³ ...................... B65H 75/48; A62B 35/00
[52] U.S. Cl. ................................... 242/107.6; 280/807
[58] Field of Search ............. 242/107.6, 107.7, 107.12; 280/806, 807, 808; 297/475-480

[56] References Cited

U.S. PATENT DOCUMENTS

| | | | |
|---|---|---|---|
| 4,172,568 | 10/1979 | Yamanashi et al. | 242/107.6 |
| 4,199,172 | 4/1980 | Fukunaga et al. | 242/107.6 |
| 4,228,971 | 10/1980 | Arima et al. | 242/107.6 |
| 4,364,528 | 12/1982 | Yanagihara | 242/107.7 |
| 4,391,421 | 7/1983 | Naitoh et al. | 242/107.7 |

FOREIGN PATENT DOCUMENTS 102719 8/1979 Japan .................................. 242/107.6

*Primary Examiner*—John M. Jillions

[57] ABSTRACT

This webbing winding force restraining device contemplates that when the webbing is fastened about an occupant, rotation of a takeup shaft is controlled through the action of a holding mechanism so as to restrain a winding force not to act on the takeup shaft, a control plate is provided between a lock ring and a holding mechanism for controlling rotation of this lock ring so as to make proper the positions of actuating and releasing a winding force restraining action, and a memory device for controlling rotation of the takeup shaft in a direction of winding the webbing relative to the lock ring at a predetermined position is provided between the lock ring and the takeup shaft, whereby, even when the occupant changes the driving posture, the winding force restraining state is not released.

12 Claims, 20 Drawing Figures

FIG-16
FIG-17
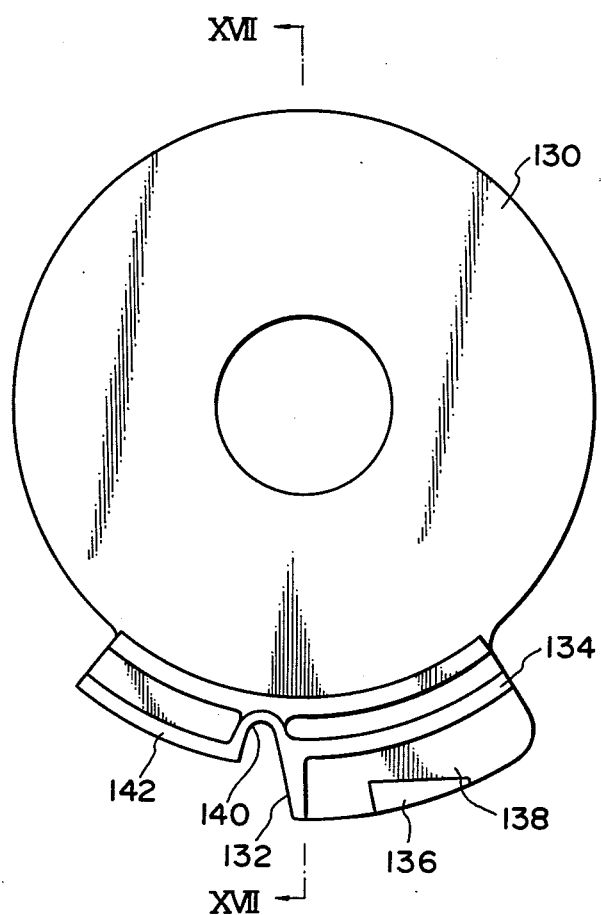
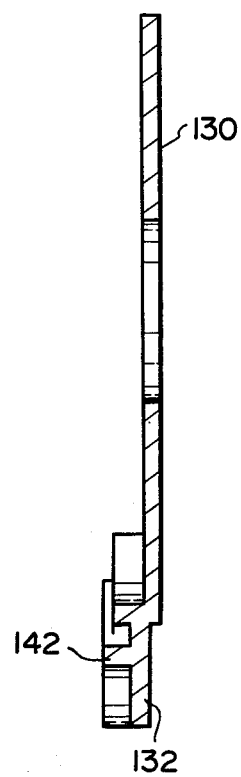

WEBBING WINDING FORCE RESTRAINING DEVICE

BACKGROUND OF THE INVENTION

1. Field of the Invention

This invention relates to a webbing winding force restraining device used in an occupant protecting seatbelt system for restraining a winding force of an occupant restraining webbing when necessary to obviate a sense of oppression which would otherwise be given to an occupant.

2. Description of the Prior Art

In a seatbelt system for protecting an occupant in an emergency situation of a vehicle such as a collision, a webbing is fastened about the occupant, the webbing is adapted to restrain and protect the occupant in an emergency situation of the vehicle, and one end portion of the webbing is wound into a retractor secured to a vehicle body through a biasing force. In consequence, a predetermined tensile force is constantly applied to the webbing to closely fasten the webbing about the occupant, however, this tensile force acts on the occupant as a sense of oppression to cause a fatigue to the occupant during driving for a long period of time.

To obviate the above-described disadvantage, there have heretofore been proposed various winding force restraining devices in which the winding force is restrained from acting on the webbing after the webbing has been fastened about the occupant, to thereby obviate the sense of oppression which would otherwise be given to the occupant.

Notwithstanding, with these winding force restraining devices, positions of actuating and releasing the restraining action are improper, and a large gap tends to occur between the webbing and the occupant during normal running of the vehicle, and, even after the webbing is unfastened from the occupant, the restraining action is not released and the webbing is not properly wound into the retractor, whereby the webbing droops, thus causing a hindrance to the door closing action. Furthermore, with the conventional winding force restraining device, there has been the disadvantage that, during normal running condition of the vehicle, when the occupant changes his driving posture to allow the webbing to be unwound from a takeup shaft, the restraining action tends to be accidentally released.

SUMMARY OF THE INVENTION

The present invention has been developed to obviate the above-described disadvantages of the prior art and has as its object the provision of a webbing winding force restraining device in which positions of actuating and releasing the restraining action are proper and, even if the occupant changes his driving posture during driving, the restraining action is not released.

With the webbing winding force restraining device according to the present invention, when the webbing is fastened about the occupant, rotation of a takeup shaft is regulated through the action of a holding mechanism so as to restrain a winding force not to act on the takeup shaft, a control plate is provided between a lock ring and a holding mechanism for controlling rotation of this lock ring so as to make proper the positions of actuating and releasing a winding force restraining action, and a memory device for controlling rotation of the takeup shaft in a direction of winding the webbing relative to the lock ring at a predetermined position is provided between the lock ring and the takeup shaft, whereby, even when the occupant changes the driving posture, the winding force restraining state is not released.

Description will hereunder be given of embodiments of the present invention with reference to the drawings.

BRIEF DESCRIPTION OF THE DRAWINGS

FIG. 16 is a front view showing the control plate in the second embodiment;

FIG. 17 is a sectional view taken along the line XVII—XVII in FIG. 16;

DESCRIPTION OF THE PREFERRED EMBODIMENTS

Figure 1:
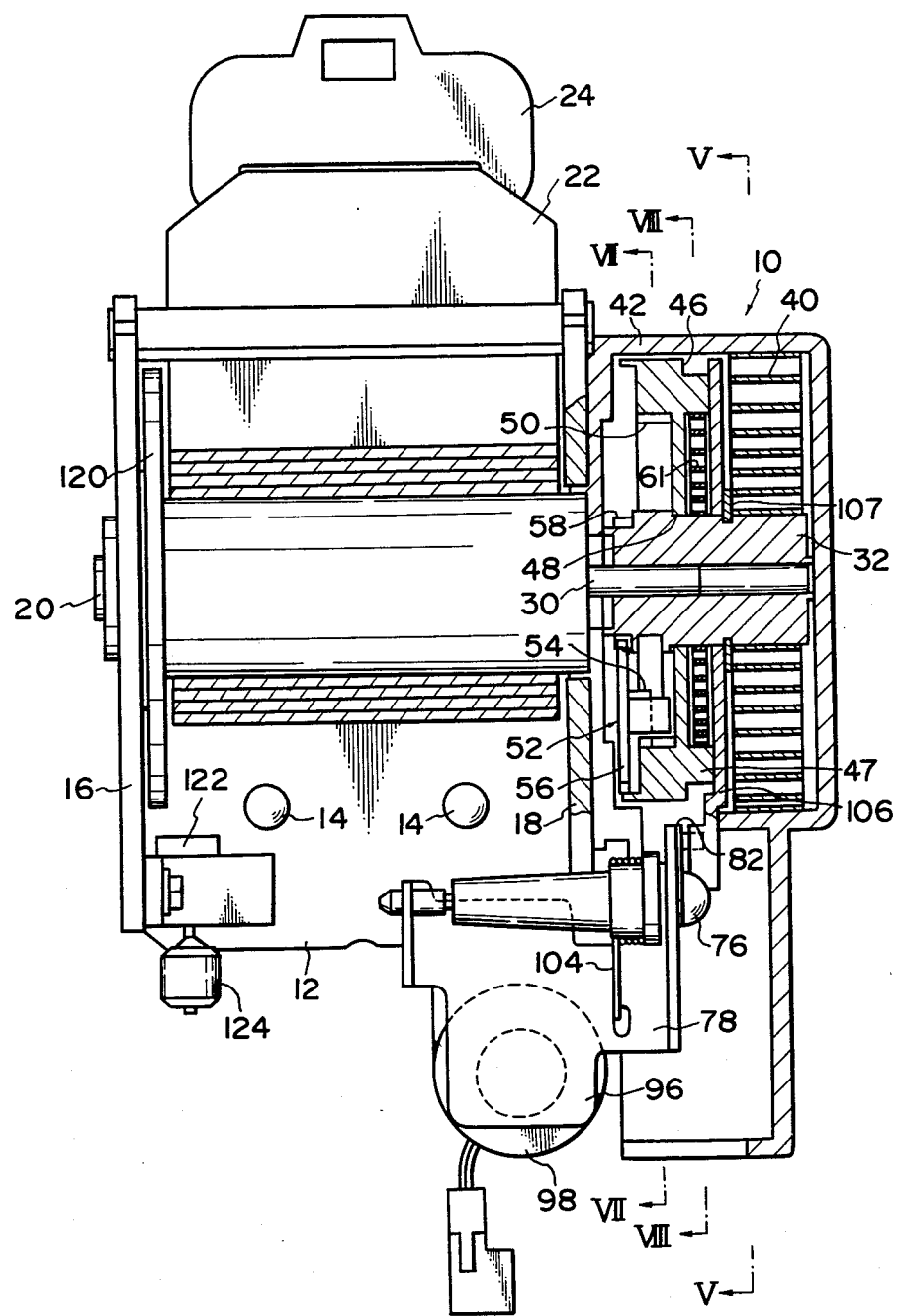
FIG. 1 is a sectional view showing an embodiment of the webbing winding force restraining device according to the present invention.
Figure 2:
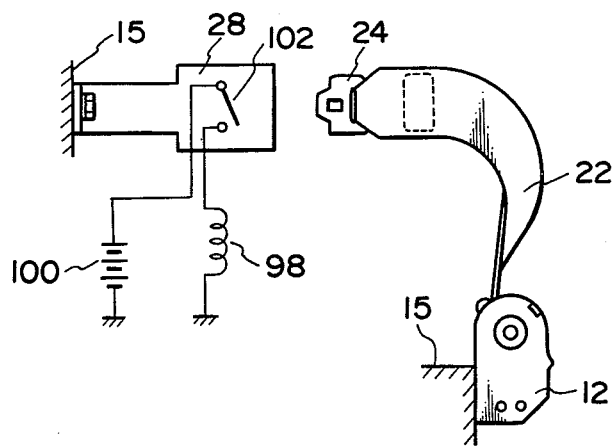
FIG. 2 is an explanatory view showing the opposed relationship between the buckle device and the tongue plate.

As shown in FIG. 1, a webbing winding force restraining device 10 is secured to the side surface of a winding frame 12. This winding frame 12 is solidly secured at substantially the central portion thereof to a vehicle body 15 (Refer to FIG. 2) through rivets 14, has a pair of leg plates 16 and 18 extending from opposite side portions thereof in parallel to each other, and a takeup shaft 20 is journalled on these leg plates 16 and 18. Wound onto this takeup shaft 20 in layers is one end portion of an occupant restraining webbing 22. Secured to the forward end of this webbing 22 is a tongue plate 24, which is engageable with a buckle device 28 solidly secured to the vehicle body 15 as shown in FIG. 2.

In consequence, when the occupant desires to fasten the webbing about himself and draws the webbing 22 out of the winding frame 12 to engage it with the buckle device 28, the intermediate portion of the webbing 22 can be fastened about him.

Figure 3:
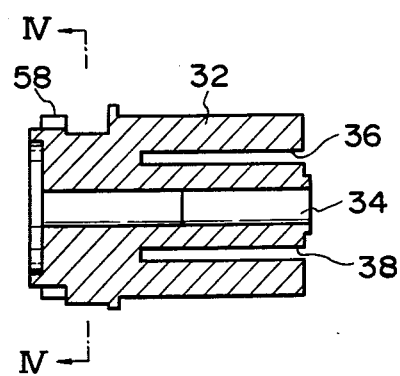
FIG. 3 is a sectional view showing the gear shaft.
Figure 4:
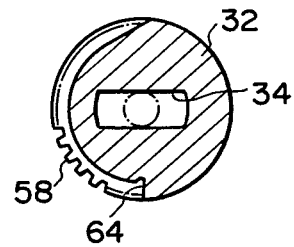
FIG. 4 is a sectional view taken along the line IV—IV in FIG. 3.

Affixed to a small diameter portion 30 of the takeup shaft 20 projecting from the leg plate 18 is a gear shaft 32 shown in FIG. 3, which is rotatable with the takeup shaft 20. This gear shaft 32 has a through-hole 34 provided with a rectangular portion as shown in FIG. 4, and the small diameter portion 30 having a rectangular configuration is inserted through the through-hole, whereby the take-up shaft 20 and the gear shaft 32 are rotatable integrally with each other.

Figure 5:
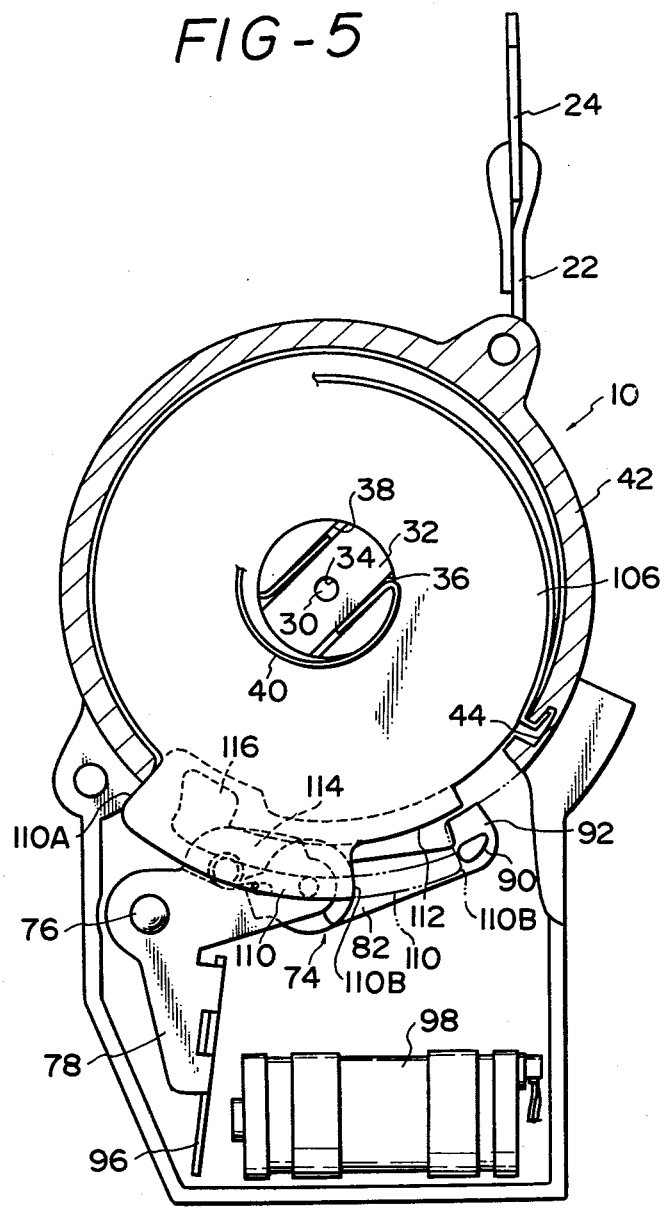
FIG. 5 is a sectional view taken along the line V—V in FIG. 1.

As shown in FIG. 5, this gear shaft 32 is formed at opposite sides of the through-hole 34 thereof with a pair of slits 36 and 38 in parallel to each other, and an inner end of a large spiral spring 40 as being a main resilient member is inserted into the slit 36. An outer end of this large spiral spring 40 is inserted into a cutout 44 (Refer to FIG. 5) formed at a portion of a casing 42 solidly secured to the leg plate 18 of the winding frame 12. With the above-described arrangement, the large spiral spring 40 rotatably biases the takeup shaft 20 through the gear shaft 32 in the direction of winding the webbing 22 (in the clockwise direction in FIG. 5) to thereby apply a tensile force to the webbing 22.

Figure 6:
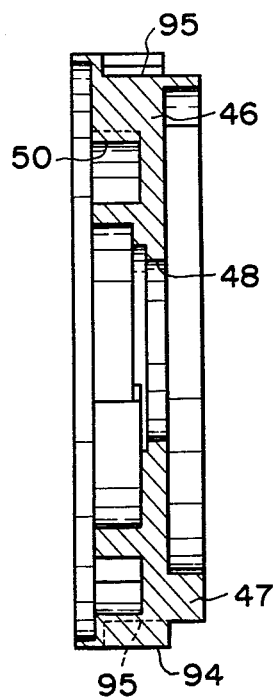
FIG. 6 is a sectional view showing the gear wheel.
Figure 7:
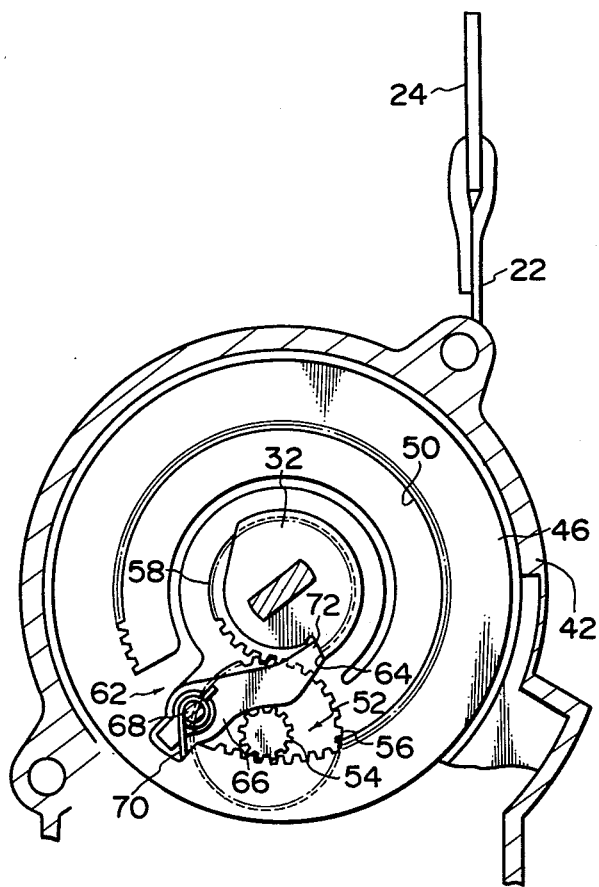
FIG. 7 is a sectional view taken along the line VII—VII in FIG. 1.

On the other hand, a gear wheel 46 as being a lock ring is journalled on the outer periphery of the axially intermediate portion of the gear shaft 32. As shown in FIG. 6, this gear wheel 46 is journalled at a round hole 48 thereof on the outer periphery of the gear shaft 32 so that the gear wheel 46 can rotate relative to the gear shaft 32 and the takeup shaft 20. This gear wheel 46 is formed with internal gear teeth 50 coaxially with the takeup shaft 20. Meshed with these internal gear teeth 50 is a pinion 54 of a planetary gear 52 as shown in FIG. 7. A gear 56 of this planetary gear 52 is meshed with external gear teeth 58 formed on the outer periphery of the gear shaft 32. In consequence, the gear shaft 32, the planetary gear 52 and the gear wheel 46 constitute a planetary gear mechanism.

Figure 8:
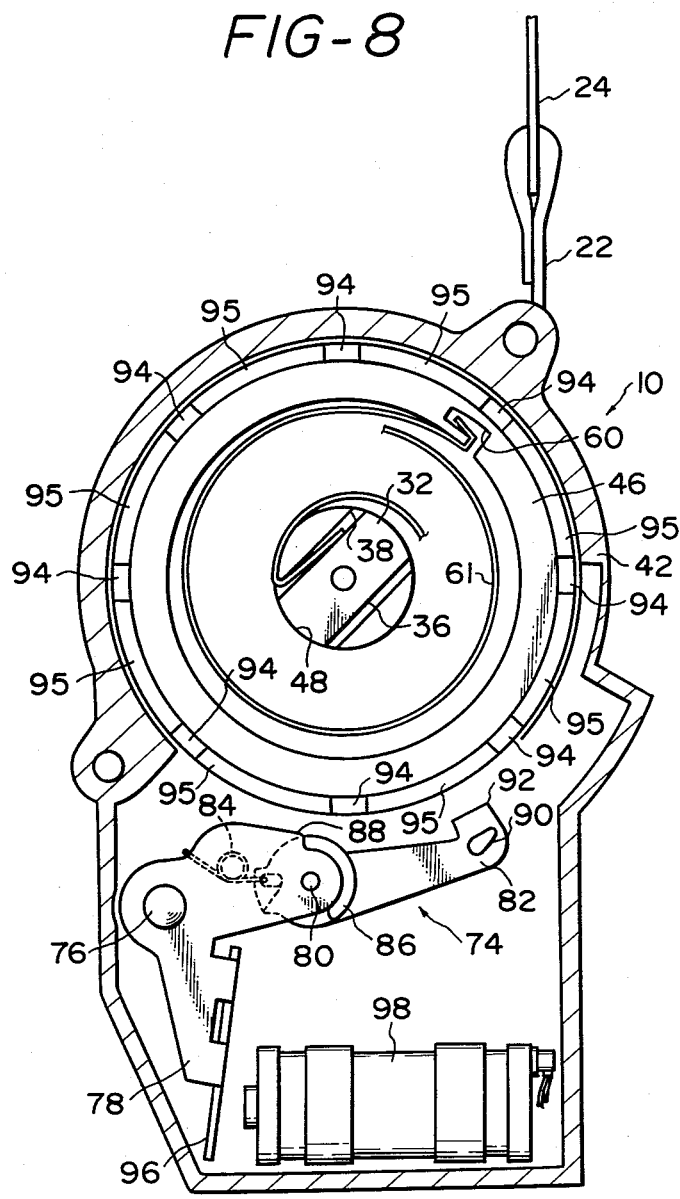
FIG. 8 is a sectional view taken along the line VIII—VIII in FIG. 1.

As shown in FIG. 8, a small spiral spring 61 as being an auxiliary resilient member is provided between a cutout 60 formed on the inner periphery of the gear wheel 46 and the slit 38 of the gear shaft 32, whereby the gear shaft 32 and the takeup shaft 20 are biased to rotate relative to the gear wheel 46 in the direction of winding the webbing.

However, stopper means 62 shown in FIG. 7 is provided between the gear wheel 46 and the gear shaft 32, whereby the rotation of the takeup shaft 20 relative to the gear wheel 46 in the direction of winding the webbing is restricted at a predetermined position.

As shown in FIG. 7, this stopper means 62 has a notch 64 formed on the outer periphery of the gear shaft 32 and and a pawl 66. The pawl 66 is pivotally supported on a pin 68 projecting from the gear wheel 46, and a torsional coil spring 70 is confined between the gear wheel and the pawl 66, whereby the forward end portion 72 of the pawl is biased in a direction of detaching from the notch 64, i.e., outwardly in the radial direction of the takeup shaft 20. However, the pawl 66 is pushed up by the pinion 54 of the planetary gear 52 as shown in FIG. 7 in such a condition that the takeup shaft 20 has been rotated up to the maximum wind-up position, whereby the forward end portion 72 of the pawl is meshed with the notch 64, so that the rotation of the takeup shaft 20 relative to the gear wheel 46 in the direction of winding the webbing can be restricted.

In consequence, when the rotation of the gear wheel 46 is prevented in the condition where the forward end portion 72 is meshed with the notch 64 as shown in FIG. 7, this stopper means 62 functions to prevent the large spiral spring 40 from applying a biasing force to the gear shaft 32 and the takeup shaft 20.

Figure 14:
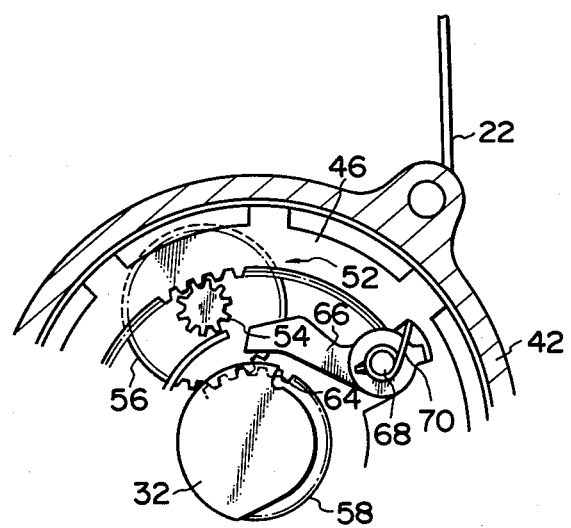
Figure 15:
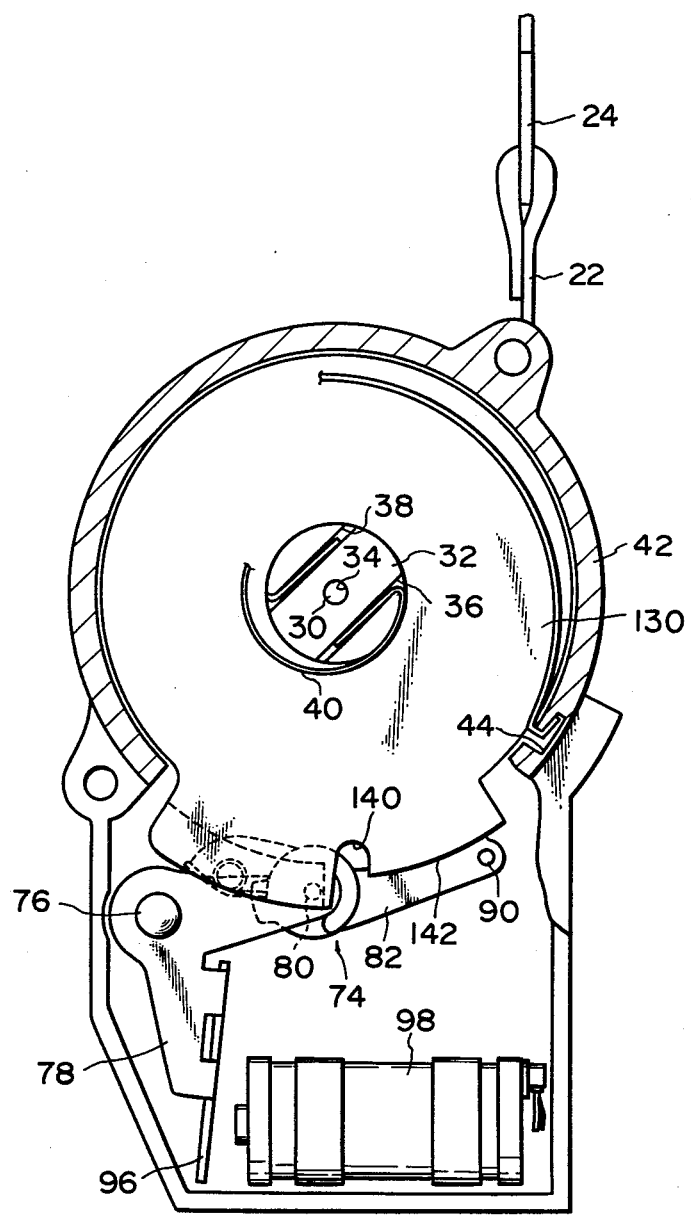
FIG. 15 is a sectional view corresponding to FIG. 5, showing a second embodiment of the present invention.

However, when the takeup shaft 20 is subjected to a turning force in a direction of withdrawing the webbing after rotation of the gear wheel 46 has been restricted, the takeup shaft 20 rotates the gear shaft 32 in the counterclockwise direction in FIG. 7, whereby the planetary gear 52 is rotated in the clockwise direction and simultaneously revolved along a predetermined path about the gear shaft 32 so as to separate the pinion 54 from the pawl 66, so that the gear shaft 32 can rotate a plurality of turns in the counterclockwise direction. (In this case, the forward end portion 72 of the pawl 66 is detached from the notch 64 as shown in FIG. 14). However, when the webbing 22 is wound again, the gear shaft 32, the pawl 66 and the planetary gear 52 are restored to the positions shown in FIG. 7 in a condition where the webbing 22 is wound again by a length which has been withdrawn, whereby the takeup shaft 20 can be prevented from rotating again in the direction of winding the webbing (In this case, the forward end portion 72 of the pawl is meshed with the notch 64 again as shown in FIG. 7).

As described above, the planetary gear mechanism and the stopper means have functions as memory means for restricting the rotation of the takeup shaft 20 relative to the gear wheel 46 in the direction of winding the webbing at the predetermined position.

Description will hereunder be given of a latch mechanism 74 as being a holding mechanism for regulating the rotation of the gear wheel 46 when deemed necessary. As clearly shown in FIG. 8, this latch mechanism 74 has a first latch 78 pivotally supported by a pin 76 erected from the casing 42 in parallel to the takeup shaft 20 and a second latch 82 pivotally supported by one end portion of the first latch 78 through a pin 80. A torsional coil spring 84 is provided between the first latch 78 and the second latch 82, whereby the second latch 82 is rotatably biased about the pin 80 in the counterclockwise direction in FIG. 8. In the position shown in FIG. 8, a projection 86 abuts against a stopper 88, whereby rotation of the second latch 82 relative to the first latch 78 is prevented. This second latch 82 is provided at a free end thereof with a pin 90 and with a hook portion 92 projecting toward the gear wheel 46. The hook portion 92 is opposed to eight projections 94 projecting from the edge portion of the outer periphery of the gear wheel 46 in the axial direction of the takeup shaft 20. In consequence, when the hook portion 92 is inserted into one of recesses 95 formed between the projections 94, the gear wheel 46 is made rotatable within a predetermined angle of rotation (in this embodiment, about 45 degrees), whereby the rotation of the gear wheel 46 is restricted.

The first latch 78 is provided at an end portion thereof opposite to the pin 80 with an attraction plate 96 which is opposed to a solenoid 98 secured to the casing 42.

As shown in FIG. 2, this solenoid 98 is connected to a vehicle power source 100 and a buckle switch 102 mounted in the buckle device 28. When the buckle device 28 is engaged with the tongue plate 24, this buckle switch 102 is closed to excite the solenoid 98, whereby the attraction plate 96 is attracted to rotate the latch mechanism 74 in the counterclockwise direction in FIG. 8, so that the hook portion 92 of the second latch 82 can approach the gear wheel 46.

Here, as shown in FIG. 1, in the first latch 78, the attraction plate 96 is biased in a direction of being separated from the solenoid 98 by a biasing force of a torsional coil spring 104 mounted around the pin 76.

Figure 9:
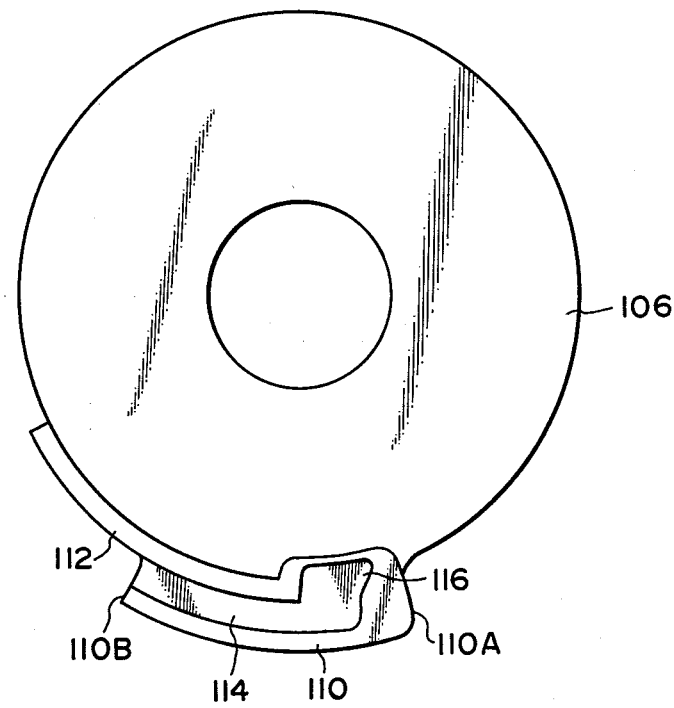
FIG. 9 is a front view showing the control plate.
Figure 10:
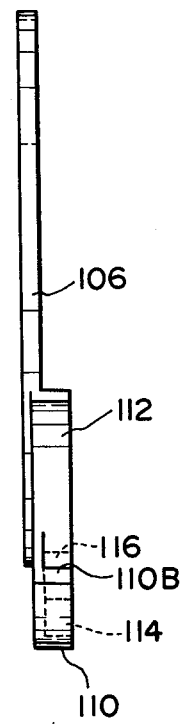
FIG. 10 is a left side view of FIG. 9.

Engagement of this latch mechanism 74 with the gear wheel 46 is controlled by a control plate 106 shown in FIGS. 9 and 10. This control plate 106 is pivotally supported on the outer periphery of the gear shaft 32, and further, as shown in FIG. 1, comes into contact with a projection 47 of the gear wheel 46 so as to impart a turning force of the gear wheel 46, i.e., a turning force of the takeup shaft 20 through a frictional force to the control plate 106. In addition, a ring 107 is secured to the gear shaft 32 between the control plate 106 and the large spiral spring 40, whereby the frictional force between the control plate 106 and the takeup shaft 20 is increased, thereby causing the control plate 106 to rotatably follow the takeup shaft 20.

This control plate 106 has a pair of ribs 110 and 112 arranged close to the outer peripheral portion thereof and in parallel to each other. These ribs are formed into circularly arcuate shapes concentric with the control plate 106, respectively, and the rib 110 is arranged farther from the axis of the control plate 106 than the rib 112. A longitudinal end face 110A of the rib 110 is opposed to the casing 42 as shown in FIG. 5, and, when the end face 110A abuts against the casing 42, the control plate 106 is prevented from rotating in the direction of winding the webbing.

The other end face of the rib 110 is opposed to substantially the longitudinally central portion of the rib 112 and formed into a radial wall 110B disposed in the radial direction of the control plate 106. When the occupant unwinds the webbing from the takeup shaft 20 to fasten the webbing about him upon his entering the vehicle, this radial wall 110B abuts against the pin 90 of the latch mechanism 74, as indicated by a two-dot chain line in FIG. 5, to thereby function as a first control portion for preventing the control plate 106 from rotating in the direction of withdrawing the webbing.

Formed between the ribs 110 and 112 is a circumferential groove 114, which is adapted to receive therein the pin 90 of the latch mechanism 74. When the attraction plate 96 of the latch mechanism 74 is attracted by the solenoid 98, the pin 90 is biased toward the axis of the control plate 106, whereby the pin 90 comes into contact with a convexely curved surface of the rib 112, so that, in this condition, the pin 90 enables the control plate 106 to rotate in the direction of withdrawing the webbing and enters the groove 114. This groove 114 and the pin 90 constitute a second control portion.

Figure 13:
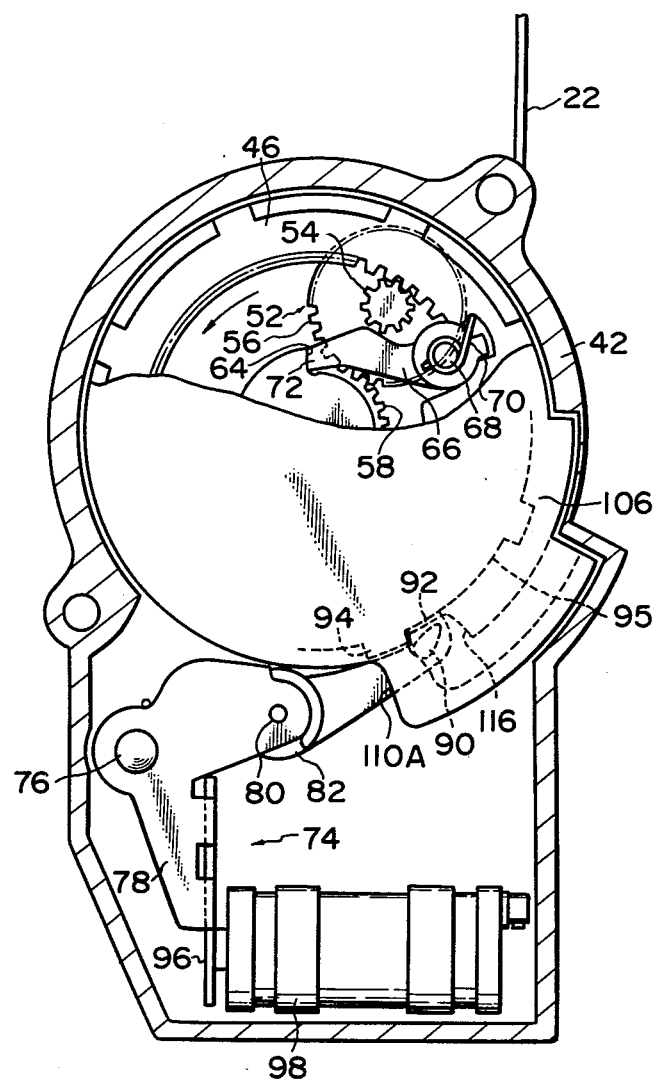

The longitudinal end of this groove 114 opposite to the radial wall 110B is communicated with a radial groove 116 disposed closer to the axis of the control plate 106 than the groove 114 is. This groove 116 and the pin 90 constitute a third control portion, and, as shown in FIG. 13, when the pin 90 enters this groove 116, the control plate 106 is prevented from rotating and the hook portion 92 of the latch mechanism 74 enters one of the recesses 95 of the gear wheel 46.

In addition, solidly secured to the takeup shaft 20 shown in FIG. 1 is a ratchet wheel 120 which is opposed to a lock bar 122 journalled on the leg plate 16. This lock bar 122 is controlled by a pendulum 124, whereby, in an emergency situation of the vehicle, the lock bar 122 is adapted to be meshed with the ratchet wheel 120 to thereby stop the webbing withdrawing rotation of the takeup shaft 20.

Description will hereunder be given of this embodiment in the actuated positions with reference to FIGS. 11 through 14.

Figure 11:
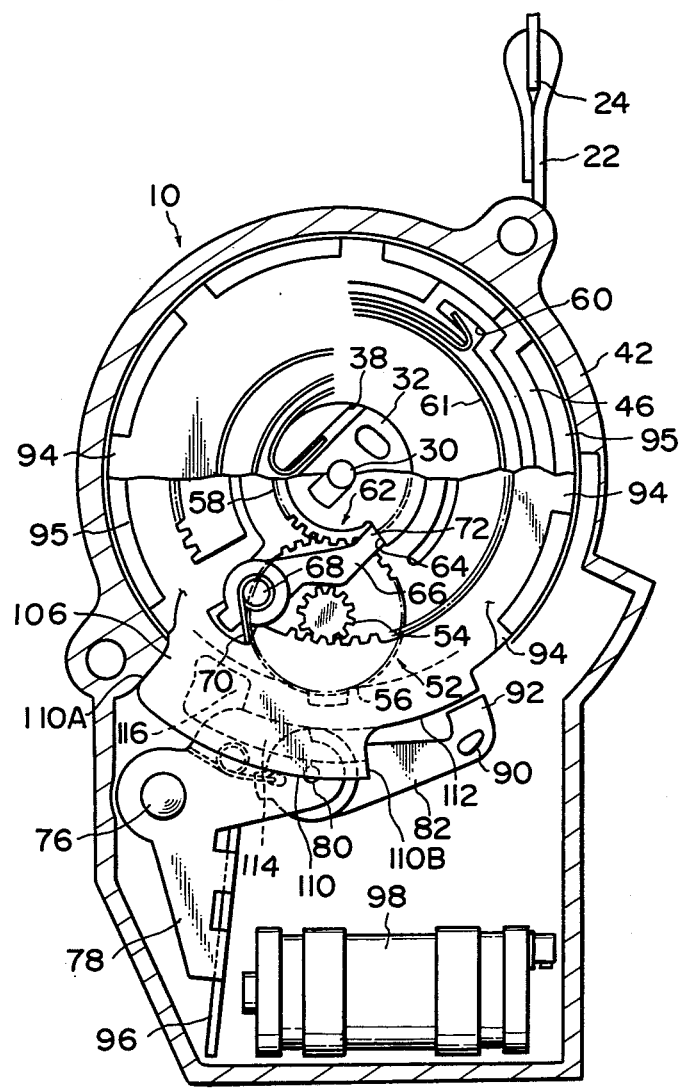
FIGS. 11 through 14 are explanatory views showing this embodiment in an actuated position.

FIG. 11 shows the maximum wound-up state of the webbing. When the occupant withdraws the tongue plate 24 from the takeup shaft 20, the control plate 106 also rotates in the direction of withdrawing the webbing, however, the pin 90 of the latch mechanism 74 abuts against the radial wall 110B of the control plate 106, whereby further rotation of the control plate 106 is prevented.

Figure 12:
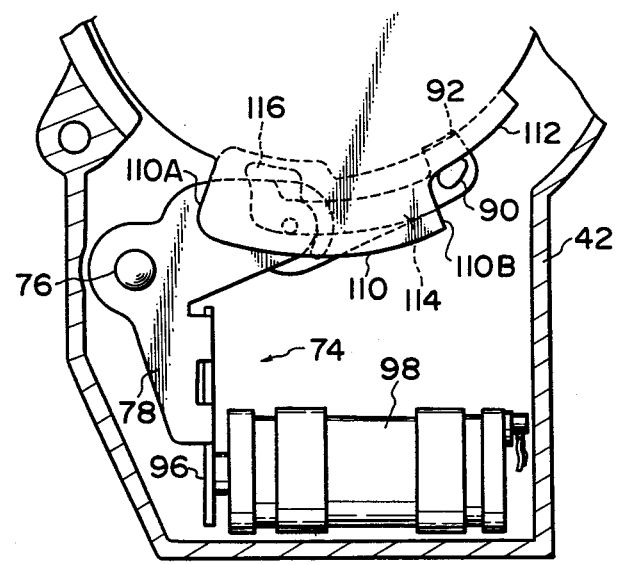

When the occupant engages the tongue plate 24 with the buckle device 28 to complete the webbing fastening, the solenoid 98 attracts the attraction plate 96 as shown in FIG. 12, whereby the pin 90 abuts against the outer periphery of the rib 112 and is opposed to the groove 114, so that the control plate 106 can rotate in the direction of withdrawing the webbing (in the counterclockwise direction in FIG. 12). However, in this state, the pin 90 is in contact with the rib 112 and does not fall into the radial groove 116, whereby the hook portion 92 of the second latch 82 is separated from the gear wheel 46, so that the takeup shaft 20 is not prevented from rotating.

Until the occupant attains the normal driving posture upon inserting the tongue plate into the buckle device to fasten the webbing about himself, the webbing 22 is slightly wound onto the takeup shaft 20. However, in this state, the takeup shaft 20 is not yet prevented from winding, so that no gap is formed between the webbing and the occupant due to this slight winding.

Thereafter, when the occupant slightly withdraws the webbing due to his small movement such as movement of breathing in the abdominal region and the like or his intentional movement, the control plate 106 slightly rotates under frictional forces by the gear shaft 32 and the ring 107 in the direction of withdrawing the webbing, whereby the pin 90 falls into the radial groove 116 of the control plate 106. In consequence, the hook portion 92 of the second latch 82 moves toward the axis of the takeup shaft and enters one of the recesses 95 between the plurality of projections 94.

With the above-described arrangement, the gear wheel 46 is rotatable within the angle defined by the plurality of projections 94 (in this embodiment, about 45 degrees), and, when the gear wheel 46 rotates in the direction of winding the webbing due to shrinkage of the abdominal region of the occupant, the projection 94 abuts against the hook portion 92, whereby the gear wheel 46 is prevented from rotating in the direction of winding the webbing.

The above-described state is the winding force restrained state, in which the winding force of the large spiral spring 40 does not act on the webbing 22, whereby a no-tension condition is brought about, so that the occupant can be relieved from the sense of oppression, thereby enabling to obtain the comfortability.

Subsequently, when the occupant moves his upper body in this webbing force restrained state during running condition of the vehicle, the webbing 22 is withdrawn from the takeup shaft 20, whereby the takeup shaft 20 is rotated in the counterclockwise direction in FIG. 13.

However, the gear wheel 46, upon rotating through an angle of rotation corresponding to the length between the projections 94 (simultaneously with this, the biasing force of the large spiral spring 40 acts on the takeup shaft 20), is prevented in the withdrawing rotation thereof by the hook portion 92 of the latch mechanism 74, whereby the planetary gear 52 rotates. As shown in FIG. 14, the planetary gear 52 revolves along the predetermined path to separate the pinion 54 from the pawl 66, whereby the pawl 66 is detached from the notch 64 of the gear shaft 32 by the biasing force of the torsional coil spring 70, so that the gear shaft 32 connected to the takeup shaft 20 can rotate a plurality of turns in the direction of withdrawing the webbing. In this state, biasing forces of both the large spiral spring 40 and the small spiral spring 61 act on the takeup shaft 20.

However, when the occupant starts taking an action of returning to the normal driving posture from this state, the planetary gear 52 is reversely revolved and the pinion 54 pushes up the pawl 66 which is meshed with the notch 64 as shown in FIG. 13, whereby the gear wheel 46 rotates through a pitch of the projection 94 in the clockwise direction from the state shown in FIG. 13, so that the projection 94, which has been separated from the hook portion 92, can be meshed with the hook portion 92 to be restored to the winding force restrained state. Thereafter, when the occupant pulls the tongue plate 24 out of the buckle device 28 to unfasten the webbing from himself, the attracting force of the solenoid 98 is removed to allow the latch mechanism 74 to slightly rotate in the clockwise direction in FIG. 13, whereby the pin 90 is detached from the radial groove 116 of the control plate 106, so that the gear wheel 46 becomes rotatable in the direction of winding the webbing. In consequence, the gear wheel 46 is rotated integrally with the takeup shaft 20 in the direction of winding the webbing by the biasing force of the large spiral spring 40, whereby the webbing 22 is wound to the maximum.

Consequently, the webbing 22, which has been wound by the high biasing force of the large spiral spring 40 upon unfastening of the webbing from the occupant, does not lie about in disorder in the compartment, thereby obviating the disadvantage, which would have otherwise occurred heretofore, that, even after the webbing has been unfastened from the occupant, the winding force reduced state is not released, whereby the webbing lying in disorder is clamped between a door and the vehicle body, and the like.

In addition, where the webbing is unfastened by the occupant in the webbing withdrawn state shown in FIG. 14, in the same manner as described above, the large spiral spring 40 and the small spiral spring 61 restore the gear wheel 46 and the takeup shaft 20 to the states shown in FIG. 13, respectively, and the takeup shaft 20 is rotated in the direction of winding the webbing, so that the webbing 22 can be wound to the maximum.

Next, FIGS. 15 through 20 show a second embodiment of the present invention, which are modifications of the control plate. Similarly to the control plate in the preceding embodiment, a control plate 130 in this embodiment is journalled on the outer periphery of the gear shaft 32 and a turning force of the takeup shaft 20 is imparted thereto through a frictional force.

The control plate 130 is provided with a wall 132 radially projecting, a wall 134 contiguous to the wall 132 and circumferentially extending and a wall 136 being of a substantially triangular shape and disposed radially outwardly of the wall 134, whereby these walls 132, 134 and 136 form a substantially U-shaped pin path 138. A pin 80 of the latch mechanism 74 is adapted to be passed through this pin path 138. An end face of the wall 136 opposed to the wall 132 functions as a first control portion similarly to the radial wall 110B in the preceding embodiment and a groove formed between the wall 134 and the wall 136 functions as a second control portion similarly to the groove 114 in the preceding embodiment. Additionally, formed at a side of the wall 132 opposite to the wall 134 is a cutout 140 directed toward the axis of the control plate 130, and a wall 142 having an outer diameter substantially equal to that of the wall 134 is formed at one end portion of this cutout 140 opposite to the wall 132. This cutout 140 and the outer periphery of the wall 142 are opposed to a pin 90 of the latch mechanism 74, and the cutout 140 functions as a third control portion similarly to the groove 116 in the preceding embodiment.

Figure 18:
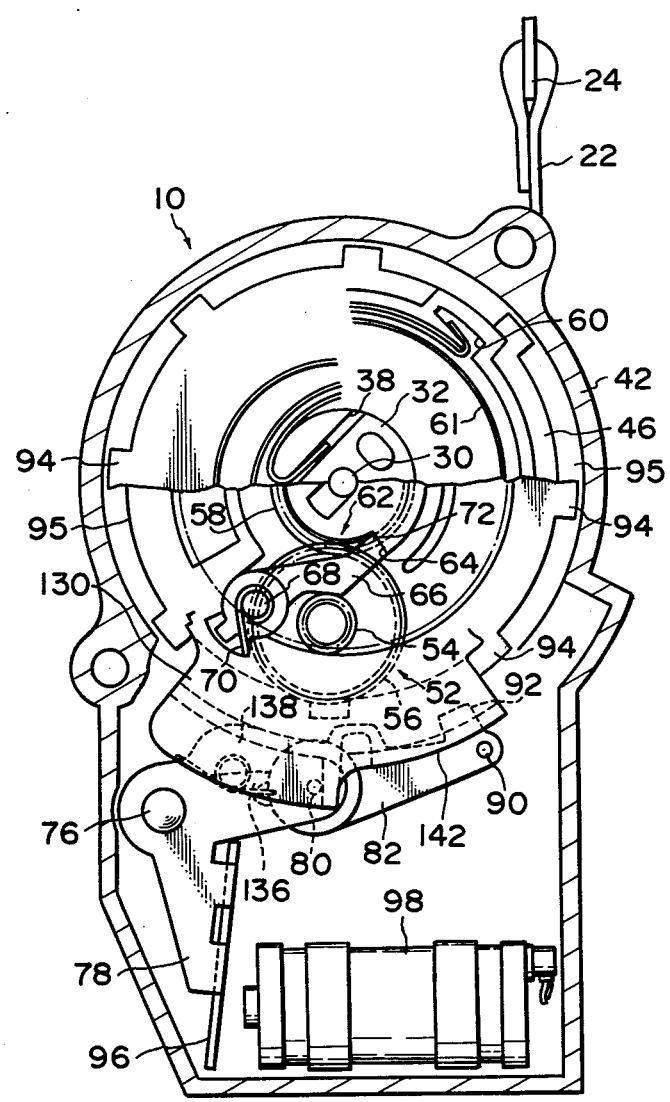
FIG. 18 is a sectional view corresponding to FIG. 11, showing the second embodiment in an actuated position.
Figure 19:
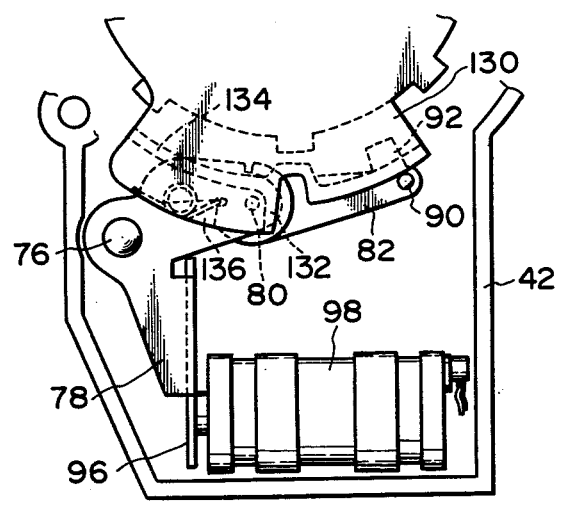
FIG. 19 is a sectional view corresponding to FIG. 12, showing the second embodiment in an actuated position.
Figure 20:
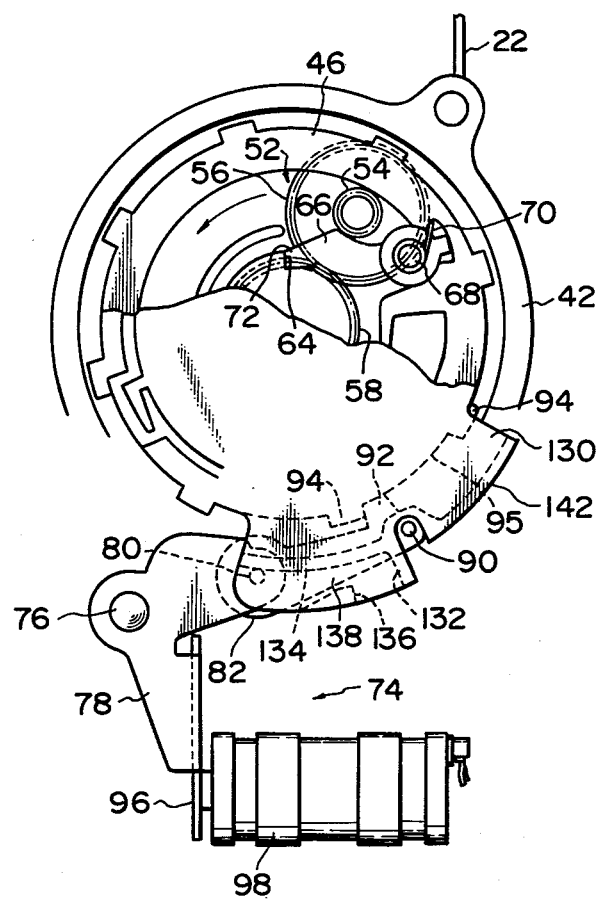
FIG. 20 is a sectional view corresponding to FIG. 13, showing the second embodiment in an actuated position.

Here, an end face of the wall 136 functioning as the first control portion receives the pin 80 between the wall 132 and itself as shown in FIG. 18 until the webbing, which has been in the webbing unfastened state, is withdrawn and brought into the webbing fastened state, whereby the control plate 130 is prevented from rotating. The groove formed between the walls 134 and 136 and functioning as the second control portion receives the pin 80, with the attraction plate 96 being attracted by the solenoid 98 as shown in FIG. 19, thus enabling the control plate 130 to rotate in the direction of withdrawing the webbing. Furthermore, when the control plate 130 rotates to some degrees in the direction of withdrawing the webbing from the state shown in FIG. 19, the groove 140 as being the third control portion receives the pin 90 as shown in FIG. 20, thereby enabling the hook portion 92 of the latch mechanism 74 to be engageable with the gear wheel 46.

Description will now be given of the operating conditions of this second embodiment. FIG. 18 shows the webbing wound up to the maximum. When the occupant withdraws the webbing 22 to be fastened about him, the attraction plate 96 is attracted by the solenoid 98 as shown in FIG. 12, whereby the pin 80 approaches the wall 134 of the control plate 130, thus permitting the control plate 130 to rotate in the direction of withdrawing the webbing. Withdrawal of the webbing to some length thereafter causes the control plate 130 to rotate, whereby the pin 90 falls into the cutout 140, so that the latch mechanism 74 can be engaged with the gear wheel 46 to bring about the winding force restrained state.

Other respects in construction and operation are similar to those in the first embodiment, so that the advantages similar thereto can be obtained.

In addition, in the above-described embodiments, the notch 64 and the pawl 66 are provided as the stopper means, however, various stopper mechanisms such that the rotation of the planetary gear 52 in the counterclockwise direction can be stopped under the condition shown in FIG. 7 are applicable to the present invention as a stopper means besides the stopper means 62. Additionally, in the above-described embodiments, the construction, in which the planetary gear mechanism is used as memory means, is illustrated, however, any memory device is applicable, in which, when the occupant has withdrawn the webbing from the normal driving posture, and then, returned to the normal driving posture again, the takeup shaft can be regulated to a predetermined position with respect to the latch gear.

The gear wheel 46 in the above-described embodiments may vary the number of the projections 94 so that the gap formed between the occupant in the normal driving posture and the webbing 22 can be desirably changed.

What is claimed is:

1. A webbing winding force restraining device used in an occupant restraining seatbelt system in an emergency situation of a vehicle for obviating a sense of oppression given to an occupant, comprising:
   (a) a takeup frame secured to a vehicle body;
   (b) a takeup shaft journalled on said takeup frame for winding said occupant restraining webbing;
   (c) a main resilient member for giving said takeup shaft a winding biasing force against said takeup frame;
   (d) a lock ring rotatable relative to said takeup shaft;
   (e) an auxiliary resilient member acting between said takeup shaft and said lock ring to rotatably bias said takeup shaft in the direction of winding the webbing;
   (f) memory means for restricting the rotation of the takeup shaft relative to the lock ring in the direction of winding the webbing at a predetermined position;
   (g) a holding mechanism on said frame which is approachable to and separatable from said lock ring for restricting the rotation of said lock ring relative to said frame when engaged with said lock ring; and
   (h) a control plate interposed between said holding mechanism and said lock ring and receiving the rotation of said takeup shaft through a frictional force, for engaging said holding mechanism with said lock ring when the webbing is withdrawn after the webbing has been fastened about the occupant, whereby when said holding mechanism engages said lock ring, said memory means is operated to restrict rotation of said takeup shaft so as not to allow the biasing force of said main and auxiliary resilient members to act on the occupant so that the sense of oppression given to the occupant can be obviated.

2. A webbing winding force restraining device as set forth in claim 1, said control plate has a first control portion for preventing the rotation of the control plate in the direction of withdrawing the webbing while the webbing is withdrawn to be fastened about the occupant, a second control portion for allowing the control plate to rotate together with the takeup shaft in the direction of withdrawing the webbing after the webbing has been fastened about the occupant, and a third control portion for permitting said holding mechanism to be engaged with the lock ring due to a slight subsequent rotation of said takeup shaft in the direction of withdrawing the webbing.

3. A webbing winding force restraining device as set forth in claim 2, wherein said second control portion is disposed closer than said first control portion to the axis of the control plate and the third control portion is disposed closer than the second control portion to the axis of the control plate.

4. A webbing winding force restraining device as set forth in claim 2, wherein said first control portion is a wall formed in the radial direction of said control plate.

5. A webbing winding force restraining device as set forth in claim 2, wherein said second control portion is a groove formed in the circumferential direction of said control plate.

6. A webbing winding force restraining device as set forth in claim 2, wherein said third control portion is a groove directed in the radial direction of said control plate and allowing the holding mechanism to approach said lock ring of the holding mechanism.

7. A webbing winding force restraining device as set forth in claim 2, wherein said second and third control portions are a continuous groove.

8. A webbing winding force restraining device as set force in claim 1, wherein said memory means comprises a planetary gear meshed with the lock ring and the takeup shaft.

9. A webbing winding force restraining device as set forth in claim 8, wherein said planetary gear comprises a gear and a pinion fixed coaxially to each other, said gear being meshed with external gear teeth formed on the takeup shaft and said pinion being meshed with internal gear teeth formed on the lock ring.

10. A webbing winding force restraining device as set forth in claim 1, wherein said holding mechanism has a latch inserted into one of spaces formed between a plurality of projections spaced a predetermined distance apart from one another on the outer periphery of the lock ring, to thereby restrict the rotation of the lock ring.

11. A webbing winding force restraining device as set forth in claim 8, wherein said memory means further comprises a notch formed on the outer periphery of the takeup shaft and a pawl journalled on the control plate and opposed to said notch, and said pawl is pushed by said planetary gear to be meshed with said notch, whereby the rotation of the takeup shaft relative to the control plate in the direction of winding the webbing is restricted at a predetermined position.

12. A webbing winding force restraining device used in a seatbelt system for restraining and protecting an occupant in an emergency situation of a vehicle such as a collision, for winding one end of an occupant restraining webbing by a biasing force thereof and obviating a sense of oppression given to the occupant, comprising:
   (a) a takeup frame secured to a vehicle body;
   (b) a takeup shaft journalled on said takeup frame for winding said occupant restraining webbing;
   (c) a main resilient member racked across the takeup frame and said takeup shaft for giving said takeup shaft a winding biasing force;
   (d) a lock ring rotatable relative to said takeup shaft;
   (e) an auxiliary resilient member interposed between said takeup shaft and said lock ring for rotatably biasing said takeup shaft in the direction of winding the webbing against said lock ring;
   (f) a latch mechanism biased in the direction of said lock ring when the webbing is fastened about the occupant for restricting the rotation of said lock ring when engaged with said lock ring;
   (g) memory means which includes a planetary gear mechanism having a sun gear formed on the outer periphery of said takeup shaft, internal gear teeth formed on said lock ring and a planetary gear meshed with said sun gear and said internal gear teeth, a pawl supported on the lock ring, and a notch formed on the outer periphery of the takeup shaft, whereby when the rotation of the lock ring is restricted and the webbing is wound onto the takeup shaft subsequent to unwinding of the webbing, said pawl is pushed by said planetary gear to engage said notch to thereby prevent the biasing force of said main and auxiliary resilient members from acting on the takeup shaft, said pawl being detached from the notch by revolving of said planetary gear in a predetermined path thereof when the webbing is further withdrawn, to thereby reapply the biasing force of said main and auxiliary resilient members to the takeup shaft, and said pawl being pushed up by the planetary gear to engage the notch when the webbing is subsequently wound to the previous notch engaging position; and (h) a control plate journalled coaxially with the takeup shaft, means for restricting rotation of the control plate to an angle within a predetermined range, means for frictionally driving the control plate by the takeup shaft, said control plate including means for permitting said latch mechanism to be engaged with the lock ring when the takeup shaft slightly rotates in the direction of withdrawing the webbing after said latch mechanism has been biased in the direction of the lock ring.

* * * * *